US008958822B2

(12) United States Patent
Liang et al.

(10) Patent No.: US 8,958,822 B2
(45) Date of Patent: Feb. 17, 2015

(54) DETERMINING POINTS OF INTEREST OF A MOBILE USER

(75) Inventors: Sam Song Liang, Palo Alto, CA (US); Jun Yang, Milpitas, CA (US); Chenyu Wang, Mountain View, CA (US); Zhigang Liu, Sunnyvale, CA (US)

(73) Assignee: Alohar Mobile Inc., Palo Alto, CA (US)

( * ) Notice: Subject to any disclaimer, the term of this patent is extended or adjusted under 35 U.S.C. 154(b) by 105 days.

(21) Appl. No.: 13/269,577

(22) Filed: Oct. 8, 2011

(65) Prior Publication Data

US 2012/0100867 A1    Apr. 26, 2012

Related U.S. Application Data

(60) Provisional application No. 61/406,198, filed on Oct. 25, 2010.

(51) Int. Cl.
*H04M 3/42* (2006.01)
*H04L 29/06* (2006.01)
(Continued)

(52) U.S. Cl.
CPC .............. *G06Q 30/0269* (2013.01); *H04W 4/02* (2013.01); *G06Q 30/0251* (2013.01); *G06Q 30/0255* (2013.01); *G06Q 30/0261* (2013.01)
USPC .................. 455/456.3; 455/414.1; 455/414.2; 455/414.3; 455/456.1; 455/456.2; 455/456.4; 455/456.5; 455/456.6; 340/988; 340/995.22; 340/995.23; 340/995.21; 701/426; 701/424; 701/438

(58) Field of Classification Search
CPC ........ H04W 4/028; H04W 4/027; H04W 4/02
USPC ..................... 455/414.1–414.3, 456.1–456.6; 701/426, 438, 424, 519, 521; 340/988, 340/995.1, 955.19, 995.2, 995.21–995.24
See application file for complete search history.

(56) References Cited

U.S. PATENT DOCUMENTS 6,917,940 B1    7/2005    Chen et al.
7,483,946 B2    1/2009    Boyd
(Continued)

FOREIGN PATENT DOCUMENTS

KR    10-2010-006083 A    6/2010

OTHER PUBLICATIONS

Using GPS to Learn Significant Locations and Predict Movement Across Multiple Users; Daniel Ashbrook and Thad Starner, College of Computing, Georgia Institute of Technology.
(Continued)

*Primary Examiner* — Dung Hong
(74) *Attorney, Agent, or Firm* — Brian R. Short

(57) ABSTRACT

Methods, systems and apparatus for tracking points of interest of a user of a mobile device are disclosed. One method includes determining points of interest of a user of a mobile device. The method includes obtaining user-related information, wherein the user-related information includes spatial information about the user, and determining at least one point of interest of the user based on the user-related information. Another embodiment includes an apparatus for determining points of interest of a user. For one embodiment, the apparatus is a mobile device. The mobile device is operative to obtain user-related information, wherein the user-related information comprising spatial information about the user, and the mobile device is operative to determine at least one point of interest of the user based on the user-related information.

30 Claims, 7 Drawing Sheets

(51) Int. Cl.
*H04W 24/00* (2009.01)
*G08G 1/123* (2006.01)
*G06Q 30/02* (2012.01)
*H04W 4/02* (2009.01)

(56) References Cited

U.S. PATENT DOCUMENTS

| | | | |
|---|---|---|---|
| 2002/0111172 A1 | 8/2002 | Dewolf et al. | |
| 2007/0219706 A1* | 9/2007 | Sheynblat | 701/200 |
| 2008/0214210 A1* | 9/2008 | Rasanen et al. | 455/456.3 |
| 2009/0150067 A1 | 6/2009 | Lindman | |
| 2009/0177384 A1* | 7/2009 | Walder | 701/208 |
| 2009/0319177 A1* | 12/2009 | Khosravy et al. | 701/207 |
| 2010/0041378 A1 | 2/2010 | Aceves et al. | |
| 2010/0073201 A1* | 3/2010 | Holcomb et al. | 340/990 |
| 2010/0106801 A1* | 4/2010 | Bliss et al. | 709/219 |
| 2010/0125406 A1* | 5/2010 | Prehofer | 701/201 |
| 2010/0229190 A1 | 9/2010 | Koo et al. | |
| 2010/0250136 A1* | 9/2010 | Chen | 701/300 |
| 2011/0071881 A1* | 3/2011 | Zheng et al. | 705/10 |
| 2011/0143777 A1* | 6/2011 | Kim et al. | 455/456.3 |
| 2011/0161427 A1 | 6/2011 | Fortin et al. | |
| 2011/0181517 A1* | 7/2011 | Orr et al. | 345/173 |
| 2011/0184640 A1 | 7/2011 | Coleman et al. | |
| 2011/0238289 A1 | 9/2011 | Lehmann et al. | |
| 2011/0239158 A1 | 9/2011 | Barraclough et al. | |
| 2011/0313649 A1* | 12/2011 | Bales et al. | 701/200 |

OTHER PUBLICATIONS

Mining Personally Important Places from GPS Tracks; Changqing Zhou, Nupur Bhatnagar, Shashi Shekhar, Loren Terveen, Department of Computer Science and Engineering, University of Minnesota.

Extracting Places and Activities from GPS Traces Using Hierarchical Conditional Random Fields, Lin Liao Dieter Fox Henry Kautz, Department of Computer Science & Engineering University of Washington.

Mining Significant Semantic Locations From GPS Data, Xin Cao† Gao Cong\ Christian S. Jensen, School of Computer Engineering, Nanyang Technological University, Singapore.

Mining GPS Data for Extracting Significant Places, G. Agamennoni, J. Nieto, E. Nebot, Australian Center for Field Robotics, University of Sydney, Australia.

Learning Significant User Locations with GPS and GSM, Department of Electrical Engineering and Computer Science, Massachusetts Institute of Technology, Sep. 2006.

* cited by examiner

DETERMINING POINTS OF INTEREST OF A MOBILE USER

FIELD OF THE DESCRIBED EMBODIMENTS

The described embodiments relate generally to location-based services. More particularly, the described embodiments relate to methods, systems and apparatuses for determining points of interest (POI) of a mobile device user.

BACKGROUND

There is an increasing need to monitor a mobile device user's location and other actions, understand the user's habits and interests, and provide intelligent personal assistance to the user based on the user's habits and interests. Presently, location based services include manual check-ins. For a manual check-in, the user opens an application on their mobile device manually, and indicates that they are at a specific business.

Additionally, location-based searches are manual. That is, the user conducts a search of some business using keyword, such as "restaurant", and the application returns results that are the closest to the user's current location.

Other location-based service includes mobile social applications wherein, for example, friends are shown on a map. However, that services and applications are limited because they can't accurately determine the point of the interest the user is at, hard to disambiguate between multiple points of interest near each other. Generally, current local business or POI search is only using the spatial data as input, which does not generally provide enough information to accurately determine the point of interest.

It is desirable to have an apparatus and method that can accurately determine points of interest (POI) of a user.

SUMMARY

An embodiment includes a method of determining points of interest of a user of a mobile device. The method includes obtaining user-related information, wherein the user-related information includes spatial information about the user, and automatically determining at least one point of interest of the user based on the user-related information.

Another embodiment includes an apparatus for determining points of interest of a user. For one embodiment, the apparatus is a mobile device. The mobile device includes a plurality of sensors and a processor. The processor is operative to receive at least one input from the plurality of sensors including obtaining user-related information, wherein the user-related information includes spatial information about the user. The processor is further operative to automatically determine at least one point of interest of the user based on the user-related information.

Another embodiment includes a system for tracking points of interest of a user. For one embodiment, the system includes a mobile device that is optionally connected to a network. The mobile device is operative to obtain user-related information either by itself, or from the network. Further, the system (mobile device and/or a server connected to the network) is operative to determine at least one point of interest of the user based on the user-related information either on the mobile device, or in a remote server through the network.

Another embodiment includes a program storage device readable by a machine, tangibly embodying a program of instructions that when executed by a mobile device connectable to the machine cause the mobile device to perform a method of determining a point of interest of a user. The method includes obtaining user-related information, the user-related information including spatial information about the user, and automatically determining at least one point of interest of the user based on the user-related information.

Other aspects and advantages of the described embodiments will become apparent from the following detailed description, taken in conjunction with the accompanying drawings, illustrating by way of example the principles of the described embodiments.

DETAILED DESCRIPTION

Figure 1:
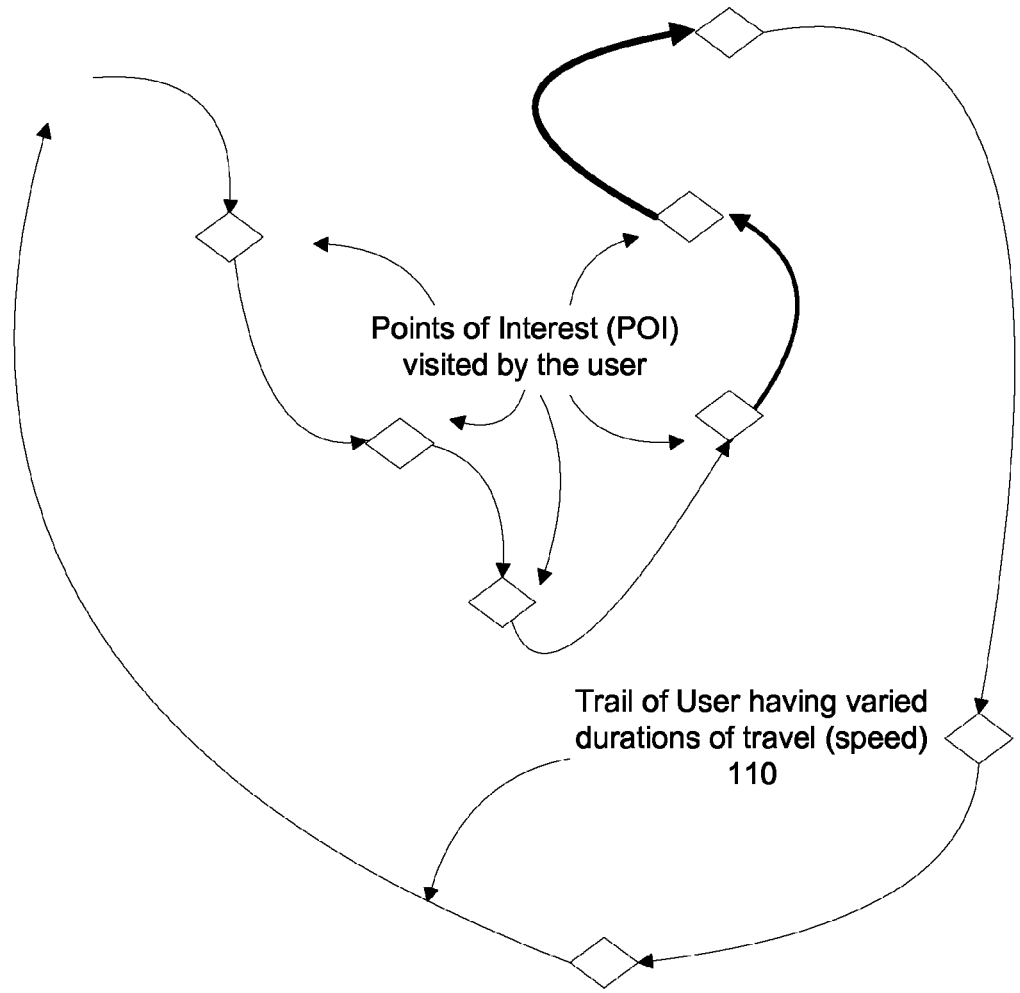
FIG. 1 shows an example of a map that depicts locations traveled by an individual that further depicts points of interest of the user.

The described embodiments include methods, systems and apparatuses for determining points of interests (POI)s of a user of a mobile device. The embodiments utilize one or more pieces of user-related information of the user to identify locations of interest of the user. For at least some embodiments, the determination is made automatically.

There is an increasing need to automatically monitor the user's location and other actions, understand the user's habits and interests, and provide intelligent personal assistance to the user based on the user's habits and interests. Examples of intelligent personal services include spatial reminders. These are reminders are useful to the user, and these reminders are based at least in part upon spatial information of the user. Intelligent personal services can include making health-related suggestions, such as doing more physical activities (e.g. walking) than sitting still. Services can include, for example, recommending or suggesting to the user based on the user's habits and interests, kid-centric events in the weekend for people with children. Commercial service, such as a cheaper gas station near the user's regular commute route can be recommended.

Automation of determination of a user's points of interest can also be useful to a mobile advertiser. For example, after a mobile advertiser has displayed an ad to a device of a user, the advertiser would like to determine if the user has been to the merchant in the ad and conducted business, and determine if the ad has been converted. Additionally, advertisers desire user profile information, enabling the advertiser to intelligently send targeted advertisements.

For at least some embodiments, the determination of the user's points of interest is automatic. That is, POI determination processing is automatically executed without the user proactively or reactively providing input. For some embodiments, the determination of the user's points of interest does not require manual input from the user. The processing can be performed in the background, and operate on persistently collected sensor data (optionally upload the data to a server). For an embodiment, a background processing algorithm determines the POI. Note, all or portions of the POI determination algorithms can run on both mobile client side (the mobile device) and server side (a server connected to the mobile device through a network). Other embodiments include semi-automatic processing in which a user's input or feedback can optionally be included with the processing to improve the process. For example, user inputs, such as correcting or adding or deleting a POI, can be used as an important feedback information to boost the performance of overall POI determination processing.

For some embodiments, the processing is performed (at the mobile device and/or at the server) in real-time, and for some embodiments the processing includes post-processing. For real-time processing, the POI determination is made with a short delay (e.g. 10 seconds or a minute) after the user arrives at the POI, with a determination deadline being adaptively specified depending on the application. For post-processing, the POI determination is made beyond the short delay (or without a deadline).

FIG. 1 shows an example of a map that depicts locations traveled by an individual that further depicts points of interest. A line 110 depicts the locations traveled by the user. During the travels of the user, the user visits various points of interest. Based on the visited locations, additional points of interest can be recommended and/or suggested to the user.

The trail of the user can be marked by differing speeds (depicted by varying thickness of the line 110) of travel between points of interest. The travel speed can be used as one piece of information in the determination of points of interest and trails of interest.

Figure 2:
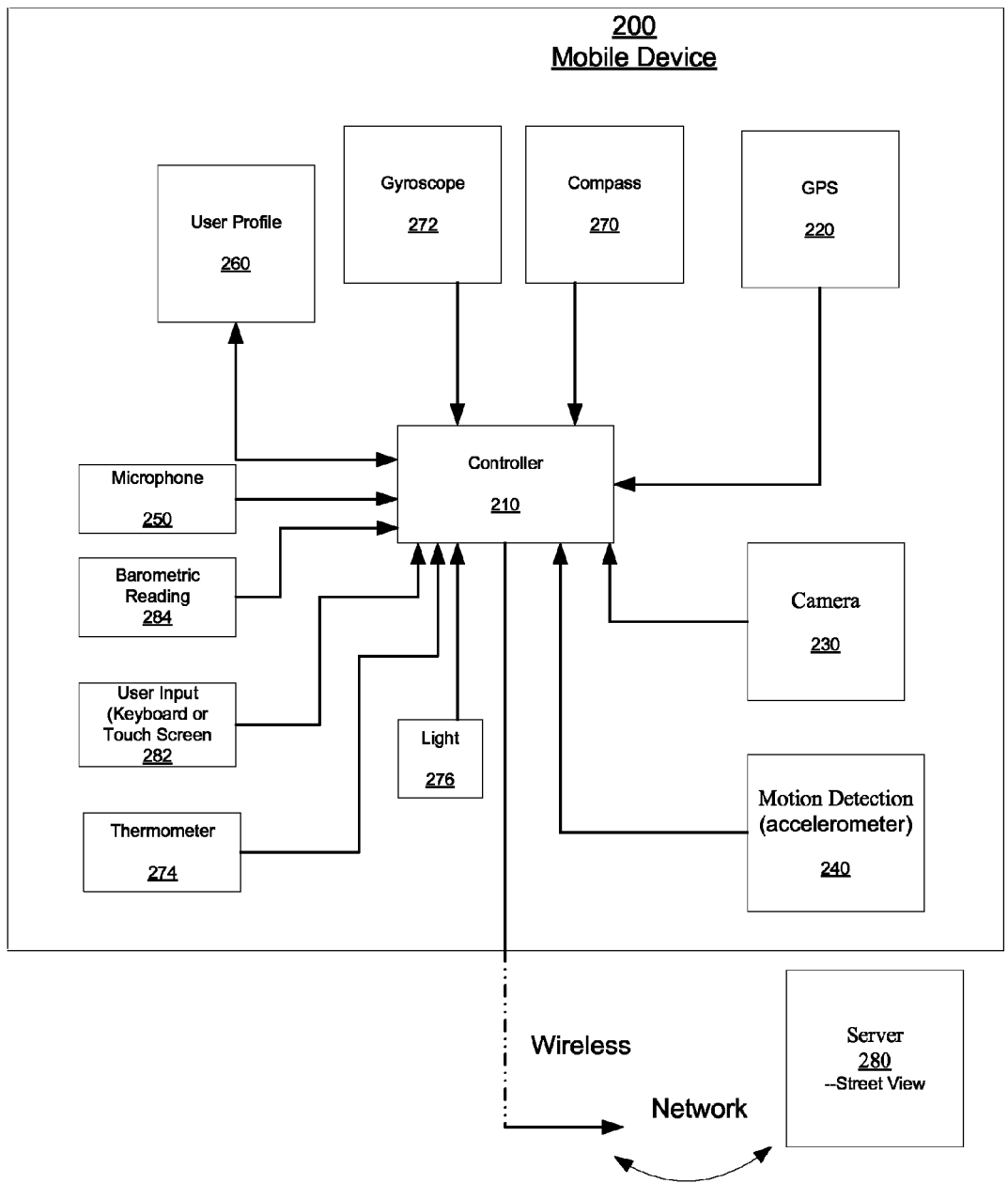
FIG. 2 shows an example of a mobile device that includes sensing capabilities of identifying locations of interest of user of the mobile device.

FIG. 2 shows an example of a mobile device 200 that includes capabilities of identifying locations of interest (points of interest) of a user of the mobile device 200. Spatial information (such as, longitude, latitude, altitude) of the user can be determined by a global positioning system (GPS) 220 of the mobile device 200. Based on the spatial information, a controller 210 (or another controller connected to the controller 210) of the mobile device 200 can roughly determine locations of the user. GPS, however, can be limited because the exact location or the actual business (point of interest) visited by the user may not be determinable from GPS alone. Embodiments provide alternate or additional pieces of location information as determined by the controller 210, or a controller (such as, server 280) electronically connectable to the controller 210.

Signals sensed by a motion sensor (for example, an accelerometer) 240 can be used to provide additional user-related information. That is, for example, the GPS 220 may be precise enough to narrow down the identification of a location of interest to three businesses. The signals generated by the motion sensor 240 can provide an indication of activity of the user, which can be used to additionally identify a location of interest. For example, when a department store (e.g. Walmart®) is located next to a cafe (e.g. Starbucks®), the user's motion pattern can be used to disambiguate between the two POIs (points of interest), Walmart® and Starbucks®. If the user's motion pattern indicates that the user has been walking around most of the time, then the probability that the user visited the department store is higher. On the other hand, if the user's motion pattern indicates that the user has been sitting still most of the time, then the probability that the user visited the cafe is higher.

Images captured by a camera 230 of the mobile device 200 can be used to provide additional user-related information. That is, for example, signs on business proximate to the user's location can be used to determine points of interest.

Audio signals sensed by a microphone 250 of the mobile device 200 can be used to provide additional user-related information. That is, for example, loud noise versus quiet noise in the background of a user's location can be used to aid in determination of points of interest. For example, because the noise level in a library is usually low, if the noise level is low, then the probability that the user is in a library is higher than the probability that user is in a restaurant.

Direction of the user can be determined by, for example, a compass 270 of the mobile device 200. The compass 270 can provide present or historical directions of the user. The directions of the user can be used to aid in the determination of points of interest.

Rotation of the user's device can be determined by, for example, a gyroscope 272 of the mobile device 200. The gyroscope 272 can provide present or historical rotations of the mobile device that the user carries. The rotations of the mobile device of the user can be used to aid in the determination of points of interest.

An ambient temperature of the user can be determined by, for example, a thermometer 274 of the mobile device 200. The thermometer 274 can provide present or historical ambient temperatures of the user. The temperature of the user can be used to aid in the determination of points of interest. For example, temperature can be used to determine whether the user is or was outside versus inside.

Exposure to light by the user can be determined by, for example, a light sensor 276 of the mobile device 200. The light sensor 276 can provide present or historical light exposure of the user. The light exposure of the user can be used to aid in the determination of points of interest. For example, sensed levels of IR can be used to determine whether the mobile device of the user is, for example, in the user's pocket, and to determine whether the user is in direct sun light.

User-input information can be received from a key-board or touch screen 282. Based on a determination that the user is using the input (key-board or touch screen), behavior of the user can be inferred, and therefore, educated guesses can be made regarding the location of the user. For example, if the user is inputting information, the user is probably not driving. If the user is talking, the user is probably not in a movie theater.

Barometric information from a barometric sensor 284 can be sensed and used to determine user-related information. For example, the barometric information can be used to deduce an altitude of the user, and therefore, be used to determine what floor of a building the user is presently located. GPS can be inaccurate inside of buildings, and therefore, barometric information can be very useful.

A network that the mobile device 200 is optionally connected to, can provide additional user-related information. For example, the server 280 of the network can include or have access to street view images that provide additional information regarding a general location that a user is at. It is to be understood that at least some embodiments are operational without the mobile device 200 being connected to the server 280. That is, the embodiments described and algorithms utilized can be performed on the mobile device when the network or the server 280 is not available.

The sensors of the mobile device 200 can be used to generate and/or influence a user profile 260 of the user of the mobile device 200.

Figure 3:
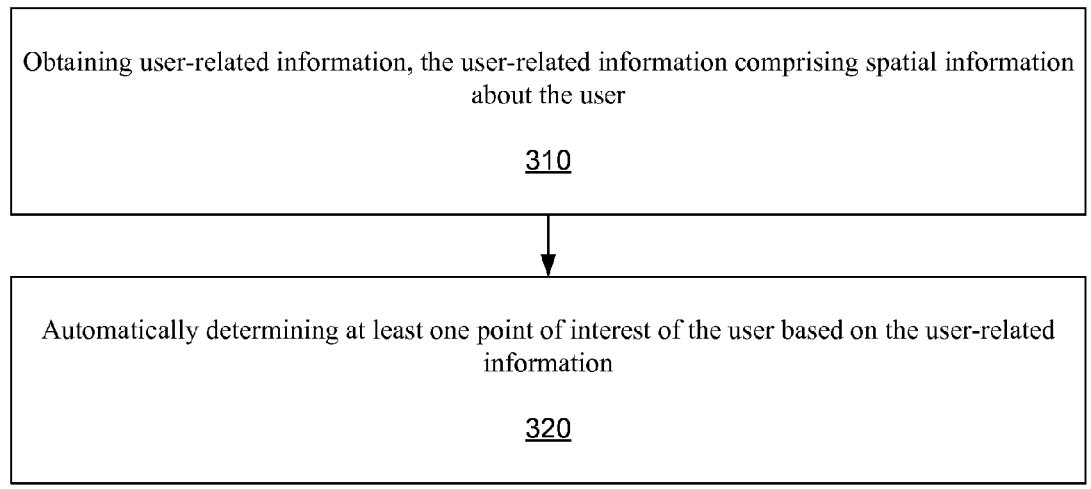
FIG. 3 is a flow chart that includes steps of an example of a method of tracking points of interest of a user of a mobile device.

FIG. 3 is a flow chart that includes steps of an example of a method of determining points of interest of a user of a mobile device. A first step 310 includes obtaining user-related information, the user-related information comprising spatial information about the user. A second step 320 includes automatically determining at least one point of interest of the user based on the user-related information.

As previously described, at least some of the user-related information can be obtained by sensors of the mobile device of the user. Additionally, as previously described, the automatic determination of the points of interest can be executed at the mobile device, at a remote (backend) server that the mobile device can be networked to, or at a combination of the mobile device and the backend server.

For the descriptions here, a point of interest (POI) can include a business name (for example, Walmart®, Starbucks®, or Safeway® grocery store). Further, a POI can include an event name (for example, a concert of Beatles®, or a baseball game in a stadium, a seminar on cooking) Further, a POI can include places personal to a user (such as, home, work place, or grandpa's home). A POI can include several properties, including a name (such as, Olive Garden®) a category (such as, a restaurant), and a subcategory (such as, Italian cuisine). A POI can have different sizes, and can have a hierarchical structure. For example, a POI can be a big park, such as Yosemite. Inside the park, there can be smaller POIs, such as a hotel or a restaurant.

An embodiment further includes obtaining spatial information about the user, and identifying at least one point of interest of the user based on the spatial information and the user-related information. The spatial information can include, for example, include latitude, longitude, and/or altitude. For an embodiment, this information is obtained through the use of a GPS receiver located within the mobile device.

As previously described, for an embodiment, the determination of the at least one point of interest is processed real-time. For another embodiment, the determination of the at least one point of interest is post-processed. For real-time processing, the POI determination is made with a short delay (e.g. 10 seconds or a minute) after the user arrives at the POI, with the determination deadline adaptively specified depending on the application. For post-processing, the POI determination is made beyond the short delay (or without a deadline).

For an embodiment, the user-related information further includes temporal information about the user. That is, for example, the user-related information includes timing associated with the spatial information. The timing can include, for example, a time of day, a day of week, a holiday, and/or a month of a year. Alternatively or additionally, the timing can include information accessed, for example, from calendar of mobile device. The timing can additionally and/or alternatively include durations of time spent at a location.

For an embodiment, the user-related information includes information (such as, keywords) obtained from a calendar of the user. The keywords can be located within, for example, a calendar event, or a description within the calendar.

For an embodiment, the user-related information further includes motion information about the user. For an embodiment, the user-related information related to motion includes acceleration information of the mobile device. For another embodiment, the user-related information related to motion includes rotation information of a gyroscope of the mobile device. For a specific embodiment, the acceleration information and rotation information is tracked to determine motion patterns of the user to aid in identifying the at least one point of interest. For example, the acceleration information and rotation information can track the user walking, sitting, and/or driving. These activities that can be deduced base on sensed acceleration information can be used to refine determinations of points of interest.

For an embodiment, the user-related information further includes historical information about the user. That is, the user-related information is tracked over time and available for future processing. For example, the type of restaurants preferred by the user can be determined based on historical information about the user. In addition, the mobile patterns, such as what type of businesses the user prefers to visit on a certain day (e.g. weekdays or weekends) of the week.

For an embodiment, the user-related information further includes image information about the user. For an embodiment, the user-related information includes satellite image information based on the spatial information. The satellite information can be used, for example, to recognize some large objects, such as swimming pool, tennis courts, parking lots, etc.

For an embodiment, the user-related image information includes street views associated with the mobile device. For example, street views that correspond to an approximate location of the user can aid in deduction along with other clues as to locations visited by the user. That is, objects in the street views can be identified, and used to further refine determinations of locations visited by the user. For example, the system can identify signs in the street views, and use image recognition techniques to identify objects (such as trees or houses) in the street-view images.

For an embodiment, the user-related image information includes image analysis of photos of the mobile device, or image analysis of photos taken at the same location at the same time by other devices. The photos can be analyzed, and image recognition of objects in photos can be used to aid in determination of locations of interest. Additionally, location tag information associated with the photos can be utilized as well.

For an embodiment, the user-related information further includes sound information about the user. For one embodiment, the user-related sound information includes sound recorded by the mobile device associated with the spatial information. For another embodiment, the user-related sound information includes levels of sound and the frequency of sound recorded by the mobile device.

For an embodiment, the user-related information includes sound recorded by the mobile device associated with the spatial information. That is, the spatial information can provide a first estimate of the location of the user, and recorded sound by the mobile device can be used to additionally deduce or determine the locations visited by the user, and therefore, locations of interest of the user. The recorded sound can include identifying distinct sounds and/or determining levels of sounds recorded by the mobile device. For example, a large amount of background noise can be used to deduce that the user is within public place, such as, a bar or cafe.

For an embodiment, the user-related information includes wireless access points and/or types of wireless communication. That is, for example, WiFi access points accessed by the mobile device can be used to estimate locations of interest. As another example, accessing a Bluetooth© network by the mobile device in conjunction with certain levels of acceleration can be used to deduce that the use (and the mobile device) are within an automobile. For another embodiment, the user-related information includes ESSIDs of wireless access points. For example, if an ESSID contains "StarBucks®", then there is a high probability that the user is using the Starbucks WiFi. Near-field communications (NFC) can additionally or alternatively provide location information. That is, an NFC sensor tag (e.g. Walmart®, Starbucks®) can be used to determine the POI. The tag can also include other location-related info, such as IDs, store names, and/or address.

For an embodiment, the user-related information includes information accessed from or posted to websites visited by the user. For another embodiment, the user-related information comprises information accessed from or posted to social websites visited by the user. This information can include, for example, online photos, notes and/or messages. Additionally, the social website information can be correlated with check-in places by the user from other applications, such as, Facebook®, FourSquare®, GoWalla®, etc.

For an embodiment, the user-related information includes tracking of a velocity of the user over time. Note that mathematically, velocity (a vector with speed as its magnitude) is the first order derivative of position.

Figure 4:
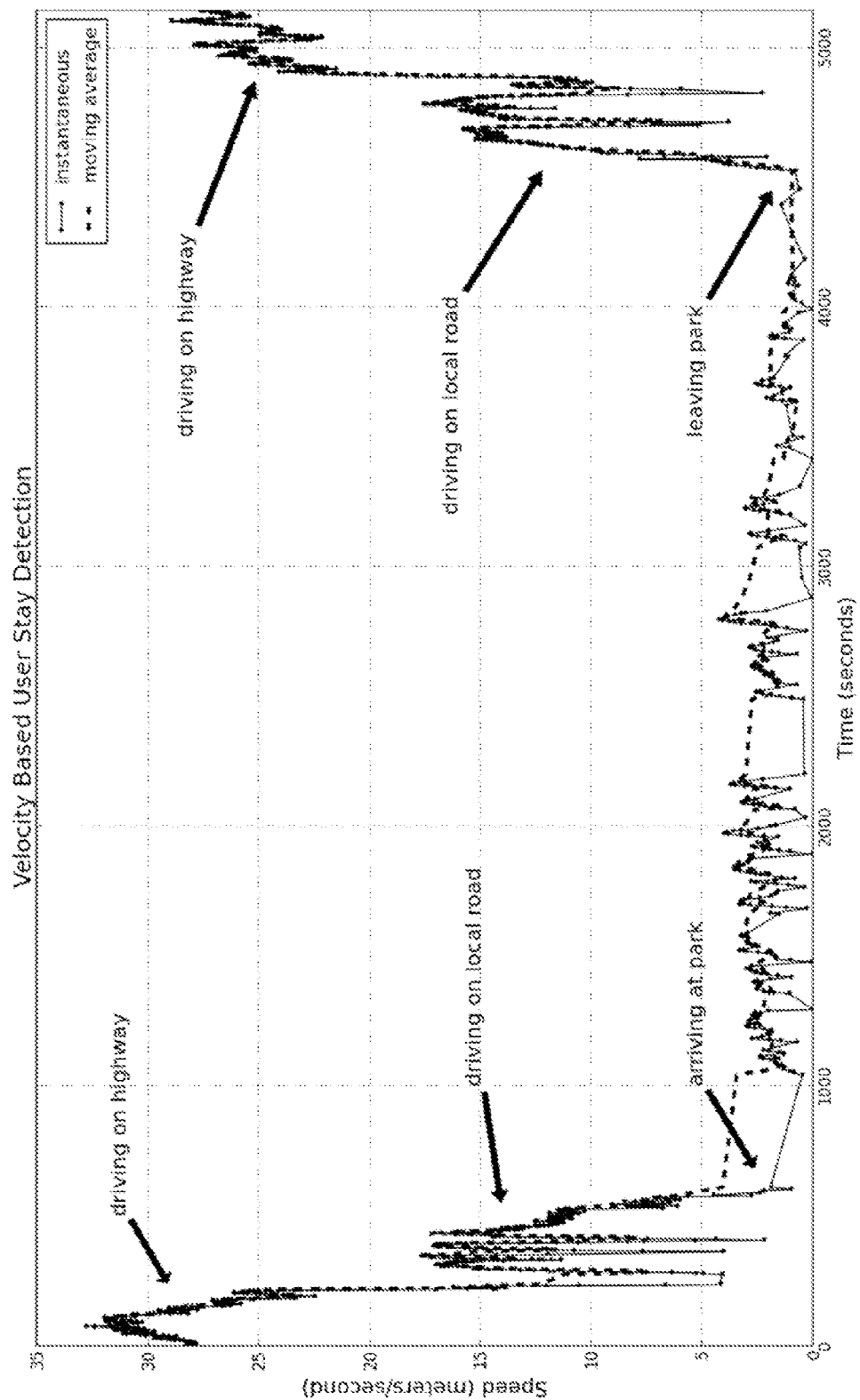
FIG. 4 is an example of a plot that depicts a user's velocity over time.

FIG. 4 illustrates an example of speed log for a user who drove to a large park, walked and bicycled in the park, and then left the park. FIG. 4 shows both instantaneous speed and moving average speed. Based on speed, the mobile device or a networked system can clearly infer segments where the user was driving on highway, driving on local road, entering the park, various movements (e.g. stop, walk, bicycle) inside the park, and departure from the park. Comparing to the use of positions in space domain, speed based detection removes the dependency on the size of a place. Namely, a user location can be detected whether it happens at a large park or a small restaurant. All that is needed is to detect when the user reduces his/her speed below certain threshold, which is easier to specify (than the size of a place) due to the common nature of movement and transportation of human beings.

In practice, speed and position based methods are generally used together to detect a user's location. They are just different features exacted from the raw sensor data. This is similar to the use of features in frequency domain and time domain to solve many machine learning problems.

Furthermore, the velocity feature can also be used for hierarchical clustering. In the above example, the user may cycle to one spot in the park, stop for a while, and then cycle to the next one. Therefore, the "park" is a high-level user stay, whereas each "spot" is a second-level user stay within the park. The various levels of user stays can be detected by extracting segments with different average speed. Namely, the segments driving to and leaving from the park have the highest average speed, e.g. above 5 m/s, while the average speed at park (high-level stay) is between 1.5 m/s and 5 m/s, and stops as each "spot" have average speed between 0 m/s and 1.5 m/s.

For other embodiments, the user-related information includes analyzing user behavior, and deducting position information. For example, one embodiment includes determining whether the user is presently using the mobile device to make a telephone call, and including this information in the user-related information. For example, if making a voice call, the user is most likely not at, for example, a movie, church or a work related meeting. Another embodiment includes determining whether the mobile device is charging, and including this in the user-related information. That is, if the device is charging, it may be likely that the user is at home, at the office or driving a car.

For an embodiment, the user-related information includes determining the ambient temperature of the mobile device, and including this in the user-related information. Temperature can be used to deduce, for example, of the user of the mobile device is inside or outside a structure. That is, heaters typically keep the insides of structures warm in the winter, and cool in the summer.

For an embodiment, the user-related information includes determining an ambient light level of the mobile device, and including this in the user-related information. For example, determination may be made as to whether the user is indoors or outdoors. Additionally, a determination may be made whether the mobile device of the user is in, for example, the user's pocket.

User-input information can be received from a key-board or touch screen. Based on a determination that the user is using the input (key-board or touch screen) behavior of the user can be inferred, and therefore, educated guesses can be made regarding the location of the user. For example, if the user is inputting information, user is probably not driving.

Barometric information can be sensed and used to determine user-related information. For example, the barometric information can be used to deduce an altitude of the user, and therefore, be used to determine what floor of a building the user is presently at. GPS can be inaccurate inside of buildings, and therefore, barometric information can be very useful.

At least some embodiments include creating a user profile for the user base at least in part on the determining points of interest of the user. For at least some embodiments, the user profile includes user selected preferences. For embodiment, the user profile includes characteristics of the user. One characteristic of the user includes a history of locations of interest of the user.

Once the profile has been created, the user can be provided with targeted information base on the user profile. Additionally or alternatively, a likelihood of conversion of targeted advertising based on the user profile can be estimated. Additionally, the user profile can be supplemented based at least in part on websites visited by the user.

At least some embodiments include providing the user with at least one reminder based on the identified points of interest. For an embodiment, this includes providing the user with at least one reminder based on at least one projected future point of interest. For an embodiment, a reminder is modified based on the user profile. For example, a user profile could be used to determine that a user has already satisfied the condition of the reminder because his profile suggests he has already visited the appropriate location. Clearly, modifying can include changing and/or removing the reminder.

As an example of the use of reminders, a user's shopping list can be tracked, and the items on the shopping list can be correlated with the shops (special POIs) the user usually visits. When the user is physically close to a shop that has one or more items on the user's shopping list, a reminder can be generated to remind the user to stop by the shop to purchase the item.

After such a reminder is generated, the mobile device monitors the user's location history, and if it detects that the user stops at the specific shop, where a specific item on the shopping list has been in one of the reminders presented to the user, the system can automatically remove the specific items, or reduce the priorities of those items. When the system detects that the user often goes to an elementary school or a child day care center, the system infers that the user may have one or more children, then the system may generate recommendations to the user for child-related events. After the system detects the user usually go to a local public library on Saturday morning, the system can automatically generates a reminder on Saturday when the user leaves home to remind the user to bring the books to return to the library.

The system tracks when the user gets gasoline for his car, and tracks the number of miles the user has driven the car after each refill. When the system detects that the user has used most of the gasoline in his tank based on the number of miles driven and the speed, as a result of the road type, such as local streets or highways, the system can start to find gas station with low prices and make recommendations to the user.

A series of points of interest (such as shown in FIG. 1) can be termed a "trail of interest". The trail of interest includes a sequence of location data points. Embodiments of each location data point can include the attributes of latitude, longitude, altitude, speed and/or a timestamp. More specifically, for an embodiment a trail of interest is defined by a plurality of points of interest of the user. For an embodiment, a frequency and/or speed of the user between points of interest is used to determine a level of importance of the trail. For example, if a user travels along one part of a trail (or route) frequently, with low speed (meaning it is a local street, rather than highway, which can be verified by using a geo-database), then some types of services along this part of the trail can be recommended to the user, with the expectation that it is more likely for the user to use the service, because it is easier for the user to stop by the service. For an embodiment, the level of importance is included within a user profile.

Figure 5:
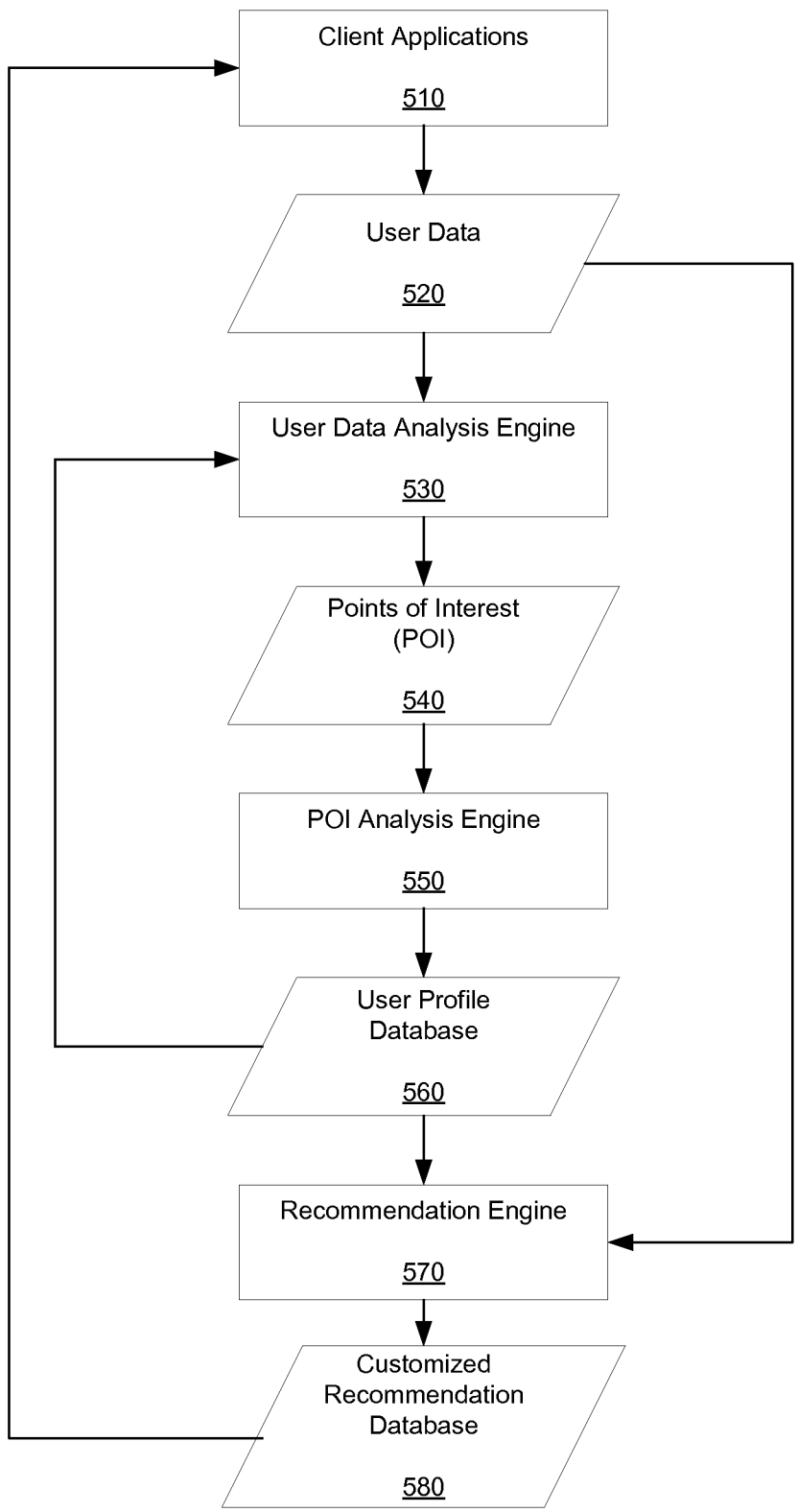
FIG. 5 shows an example of server-side processing.

FIG. 5 depicts the general architecture of the system, which collects user data through the Client Applications (510) running on the mobile device, stores the user data in the User Data Database (520), determines the user's POIs through the User Data Analysis Engine (530) based on the user data and previous user profile stored in the User Profile Database (560), stores the POI results in the POI Database (540), runs the POI Analysis Engine (550), generates the user profiles and stores them in the User Profile Database (560), generates customized recommendations to the user based on the user profile and the current user data through the Recommendation Engine 570, stores the recommendations in the Customized Recommendation Database 580, and finally presents the customized recommendation to the user through the Client Applications (510).

The algorithms using the flow chart in FIG. 5 may run in the User Data Analysis Engine (530) in FIG. 5, or they may run in the Client Applications (510) in FIG. 5. When they run in the Client Applications (510), it stores some user data in a local User Data Database on the mobile device.

Figure 6:
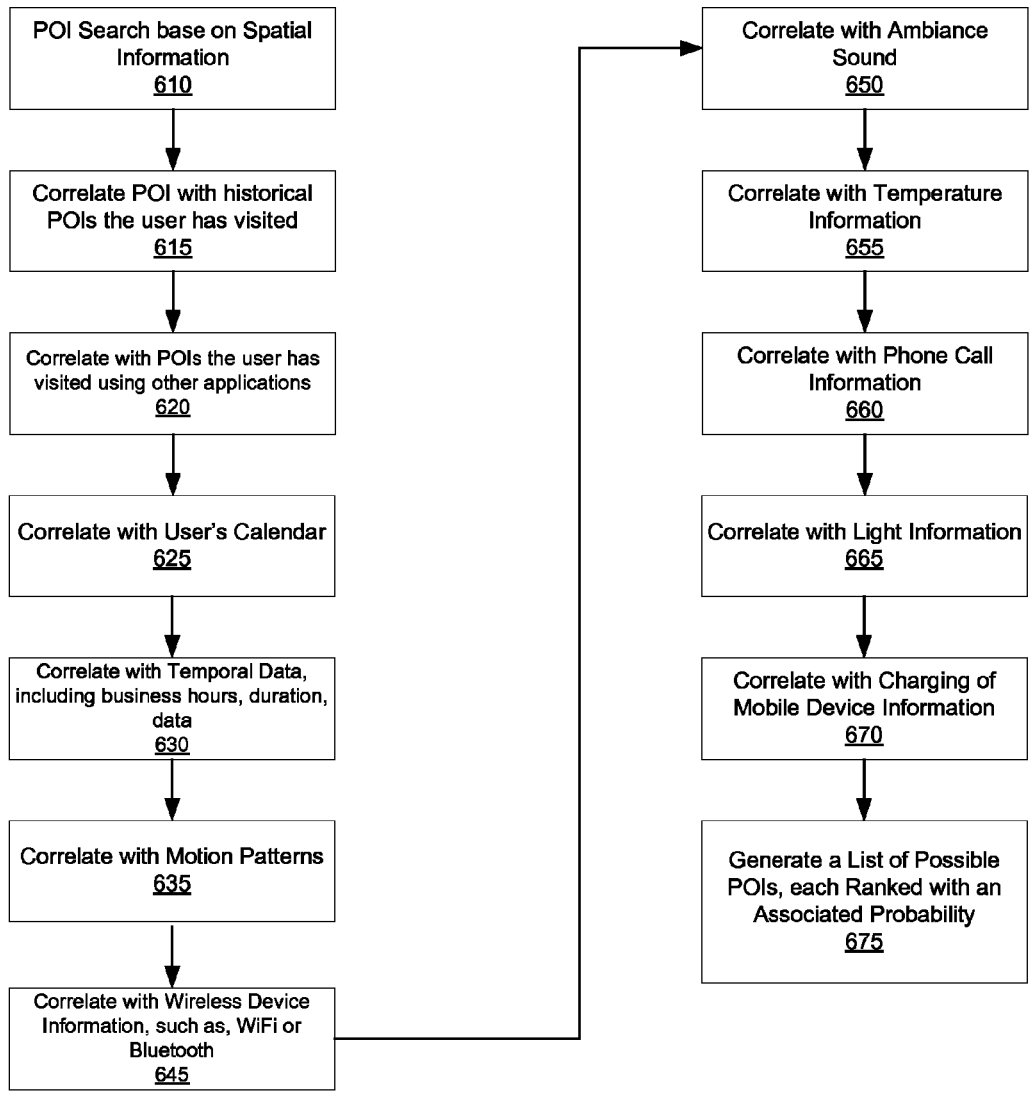
FIG. 6 shows an example of pipeline processing used for determining points of interest of a user.

FIG. 6 shows an example of pipeline processing used for determining points of interest of a user. It is to be understood that each of the individual steps of FIG. 6 are optional. That is, a step or steps can be optionally skipped or eliminated if, for example, the relevant user information is not available. Additionally, the steps are shown as being sequential, but it is to be understood that the steps can occur in parallel, and the order of the steps is flexible.

FIG. 6 depicts the processing pipeline used to accurately determine points of interests of a user. This pipeline uses multiple pieces of user-related information, and multiple criteria to adjust the order of the POI results based on the probabilities In 610, the system performs POI search based on the spatial information, including latitude, latitude, altitude (optional), using various Geo-databases, and obtain a list of probable POI results that are the closest to the location.

In 615, the system correlates the list of the results in the previous step with the historical POIs the user has visited before, adjusts the probability of each result and adjusts the order of the results accordingly.

In 620, the system correlates the list of the results in the previous step with the historical POIs the user has visited and recorded through other applications (such as social applications like Facebook®, or FourSquare®, or GoWalla®), adjusts the probability of each result and adjusts the order of the results accordingly.

In 625, the system correlates the list of the results in the previous step with the user's calendar based on the timestamp of the user data and the corresponding time on the calendar, uses the keywords in the description or location or other attributes of the event on the user's calendar to adjust the probability of each result and adjust the order of the results accordingly.

In 630, the system correlates the list of the results in the previous step with the temporal data, including the business hours for each business, the duration of the time the user spend at the location, the usual time an ordinary user visits POI, adjusts the probability of each result and adjusts the order of the results accordingly.

In 635, the system correlates motion patterns of the user with the results of the previous step.

In 645, the system correlates the list of the results in the previous step with the wireless information, such as WiFi access points, WiFi SSID, Bluetooth MAC address and Bluetooth id, adjusts the probability of each result and adjusts the order of the results accordingly.

In 650, the system correlates the list of the results in the previous step with the ambient sound, and uses the sound level (in terms of decibels or frequency or other sound attributes) to adjust the probability of each result and adjust the order of the results accordingly. For example, the sound level is low in a library, but the noise level is high in a bar or cafe.

In 655, the system correlates the list of the results in the previous step with the temperature information obtained from both the user's mobile device, and the weather temperature for the city the user is in, adjusts the probability of each result and adjusts the order of the results accordingly. For example, the system can tell whether the user is indoor or outdoor. In a hot weather, when the detected temperature on the mobile device is lower, the user may be in-door with air-conditioner. In a cold weather, when the detected temperature on the mobile device is higher than the outdoor temperature, the user may be in-door with a heater. This indoor versus outdoor information can be used to adjust the probability of various POIs.

In 660, the system correlates the list of the results in the previous step with the phone call information, adjusts the probability of each result and adjusts the order of the results accordingly.

In 665, the system correlates the list of the results in the previous step with the ambient light information, adjusts the probability of each result and adjusts the order of the results accordingly. For example, the light level in a movie theater is most of the time low, while the light level outdoor under the sunshine is high.

In 670, the system correlates the list of the results in the previous step with the charger's status, adjusts the probability of each result and adjusts the order of the results accordingly. For example, if the phone is being charged, it's likely the user is at home, work or in a car using the cigarette lighter.

Finally, in 675, after going through all the steps, a final list of POI results are generated, each with different probability. The one with the highest probability is the POI the user has mostly likely visited.

Figure 7:
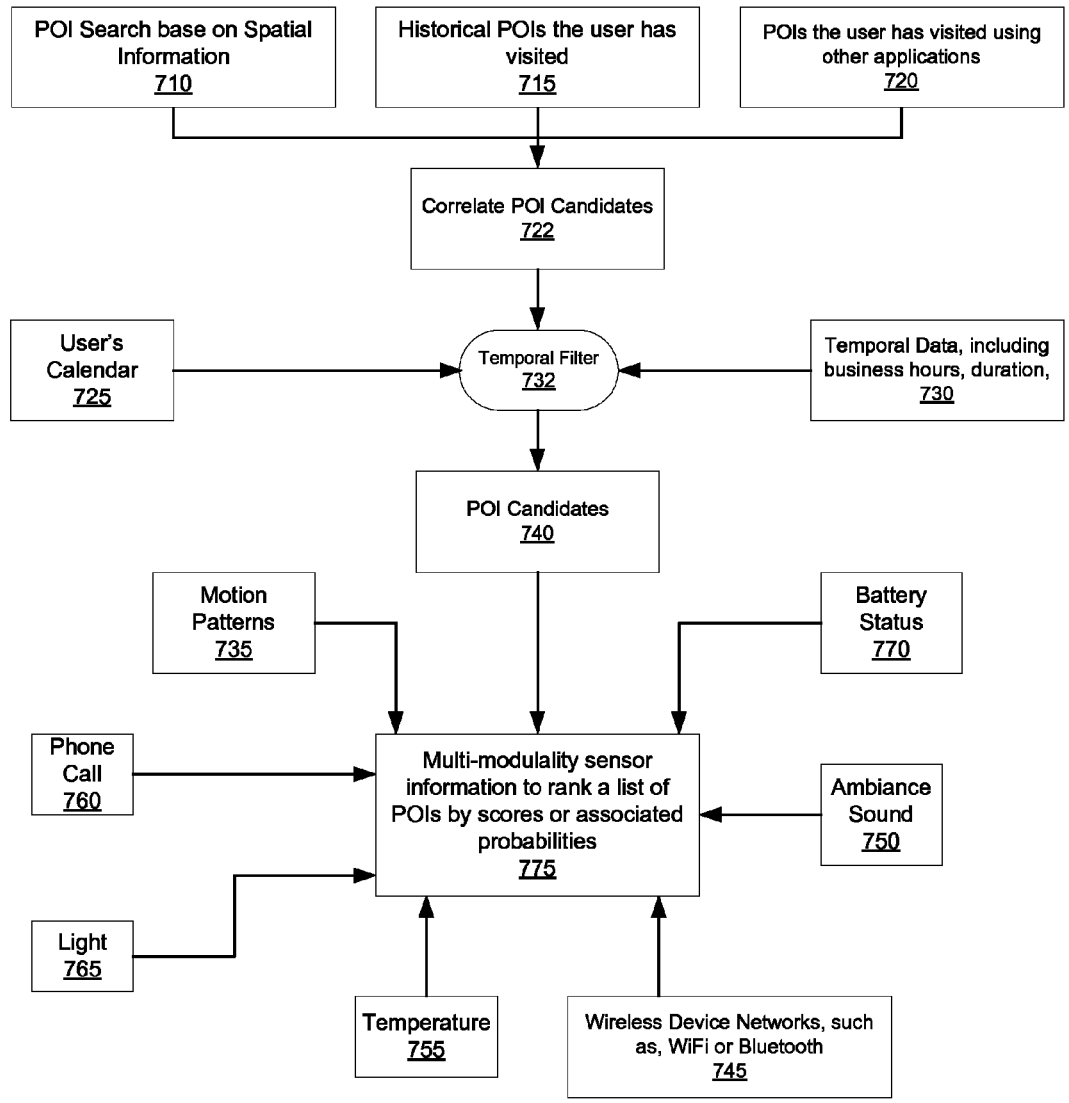
FIG. 7 shows an example of layered pipeline processing used for determining points of interest of a user.

FIG. 7 shows an example of layered pipeline processing used for determining points of interest of a user. This pipeline uses multiple pieces of user-related information, and multiple criteria to adjust the order of the POI results based on relevance.

In 710, the system (mobile device and/or a connected server) performs POI search based on the spatial information, including latitude, longitude, altitude (optional), using various Geo-databases, and obtain a list of probable POI results that are the closest to the location.

In 722, the system correlates the list of the results in the previous step with the historical POIs the user has visited before in the step of 715 and with the historical POIs the user has visited and recorded through other applications (such as social applications like Facebook®, or FourSquare®, or GoWalla®) in the step of 720, computes the probability of each result and adjusts the order of the results accordingly.

In 732, the system filters the list of the results in the previous step 722 with, for example, the user's calendar based on the timestamp of the user data and the corresponding time on the calendar in the step of 730, uses the keywords in the description or location or other attributes of the event on the user's calendar (725) to compute the probability of each result and adjust the order of the results accordingly. The system also filters the list of the results in the previous step with the temporal data in the step of 735, including the business hours for each business, the duration of the time the user spend at the location, the usual time an ordinary user visits POI, computes the probability of each result and adjusts the order of the results accordingly. The result is a list of POI candidates after temporal filtering (740).

In 735, the system receives motion pattern information from accelerometer sensor embedded in the mobile device.

In 745, the system receives the wireless information, such as WiFi access points, WiFi SSID, Bluetooth MAC address and Bluetooth ID.

In 750, the system receives the ambiance sound, and use the sound level information (in terms of decibels or frequency or other sound attributes). For example, the sound level is low in a library, but the noise level is high in a bar or cafe.

In 755, the system obtains the temperature information from both the user's mobile device, and the weather temperature for the city the user is in. For example, the system can tell whether the user is indoor or outdoor. In a hot weather, when the detected temperature on the mobile device is lower, the user may be in-door with air-conditioner. In a cold weather, when the detected temperature on the mobile device is higher than the outdoor temperature, the user may be in-door with a heater. This indoor versus outdoor information can be used to adjust the probability of various POIs.

In 760, the system receives the phone call information.

In 765, the system receives the ambient light information. For example, the light level in a movie theater is most of the time low, while the light level outdoor under the sunshine is high.

In 770, the system receives the battery charger's status. For example, if the phone is being charged, it's likely the user is at home, work or in a car using the cigarette lighter.

Finally in 775, the system (mobile devices and/or connected server) goes through the multi-modality information from the above steps of 735, 745, 750, 755, 760, 765, 770 if available and applicable and generate a final list of POI results from POI candidates in 740, each with different probability or score. The one with the highest probability or score is the POI the user has mostly likely visited.

An embodiment includes a program storage device readable by a machine, tangibly embodying a program of instructions that when executed by the machine cause the machine to perform a method of determining a point of interest of a user. The machine can be, for example, an enterprise server that provides downloadable applications to a mobile device of a mobile device user. For an embodiment, the program of instructions is downloadable from the machine to a user mobile device. When executed, the method performs obtaining user-related information, the user-related information comprising spatial information about the user, and automatically determining at least one point of interest of the user based on the user-related information.

Although specific embodiments have been described and illustrated, the embodiments are not to be limited to the specific forms or arrangements of parts so described and illustrated.

The invention claimed is:

1. A method of determining a present point of interest of a user of a mobile device, comprising:
    obtaining, by the mobile device, spatial information about the user tracked over time over a plurality of locations;
    obtaining, by the mobile device, temporal information tracked over time including a history of durations of time and frequency of past point of interest visits of the user, and timing associated with the spatial information;
    obtaining, by the mobile device, behavior patterns of the user tracked over time, including sequences of previous point of interest visits, speed and position of the user;
    obtaining, by the mobile device, behavior of the user's use of the mobile device;
    identifying activity motion of the user, including sensing acceleration or gyro motion of the mobile device and associating the sensed acceleration or gyro motion of the mobile device with spatial information of the mobile device;
    obtaining, by the mobile device, identifications of wireless access points; and
    automatically determining the present point of interest of the user after the user has arrived at the present point of interest, comprising;
    disambiguating between potential points of interest to determine the present point of interest comprising generating a list of possible points of interest and ranking the possible points of interest by probability of being the present point of interest based on the spatial information, the temporal information, the behavior patterns of the user, the user's use of the mobile device, the identified activity motion of the user, and the identifications of wireless access points.

2. The method of claim 1, wherein the determination of the present point of interest is processed real-time.

3. The method of claim 1, wherein the determination of the present point of interest is post-processed.

4. The method of claim 1, wherein the temporal information comprises timing of the user-related information comprising at least one of a time of day, a day of week, a holiday or the time duration the user-related information.

5. The method of claim 1, wherein the temporal information comprises calendar information of the user.

6. The method of claim 1, further comprising tracking motion information about the user, wherein ranking the possible points of interest by probability of being the present point of interest is additionally based on the tracked motion.

7. The method of claim 6, wherein motion information comprises acceleration information of the mobile device.

8. The method of claim 6, wherein motion information comprises rotation information of a gyroscope of the mobile device.

9. The method of claim 6, wherein motion information comprises acceleration information and rotation information which are used to determine motion patterns of the user associated with particular locations and categories of points of interest to aid in identifying the present point of interest.

10. The method of claim 1, further comprising obtaining historical information about the user including past points of interest visited by the user, wherein ranking the possible points of interest by probability of being the present point of interest is additionally based on the historical information.

11. The method of claim 1, further comprising obtaining image information about the user, wherein ranking the possible points of interest by probability of being the present point of interest is additionally based on image information.

12. The method of claim 11, wherein the image information comprises satellite image information based on the spatial information.

13. The method of claim 11, wherein the image information comprises street views associated with the mobile device.

14. The method of claim 11, wherein the image information comprises image analysis of photos of the mobile device, or image analysis of photos taken at the same location at the same time by other devices.

15. The method of claim 1, further comprising obtaining sound recorded by the mobile device associated with the spatial information, wherein ranking the possible points of interest by probability of being the present point of interest is additionally based on the sound recorded.

16. The method of claim 1, further comprising obtaining levels of sound and the frequency of sound recorded by the mobile device, wherein the ranking the possible points of interest by probability of being the present point of interest is additionally based on the levels of sound and the frequency of sound recorded by the mobile device.

17. The method of claim 1, further comprising obtaining wireless access points and/or types of wireless communication, wherein ranking the possible points of interest by probability of being the present point of interest is additionally based on the wireless access points and/or types of wireless communication.

18. The method of claim 17, wherein the wireless communication comprises at least one of Wifi, Bluetooth or near-field communications wireless signals.

19. The method of claim 1, further comprising obtaining information accessed from or posted to websites visited by the user, wherein ranking the possible points of interest by probability of being the present point of interest is additionally based on the information accessed from or posted to websites visited by the user.

20. The method of claim 19, wherein the website visited comprise social websites.

21. The method of claim 1, further comprising obtaining tracking a velocity of the user over time, wherein ranking the possible points of interest by probability of being the present point of interest is additionally based on the tracked velocity of the user over time.

22. The method of claim 1, further comprising determining whether the user is presently using the mobile device to make a telephone call, wherein ranking the possible points of interest by probability of being the present point interest is additionally based on whether the user is presently using the mobile device to make a telephone call.

23. The method of claim 1, further comprising determining whether the mobile device is charging, wherein the ranking the possible points of interest by probability of being the present point of interest is additionally based on whether the mobile device is charging.

24. The method of claim 1, further comprising determining an ambient temperature of the mobile device, wherein ranking the possible points of interest by probability of being the present point of interest is additionally based on the ambient temperature of the mobile device.

25. The method of claim 1, further comprising determining an ambient light level of the mobile device, information wherein ranking the possible points of interest by probability of being the present point of interest is additionally based on the ambient light level of the mobile device.

26. The method of claim 1, further comprising obtaining user-input key or touch screen information, wherein ranking the possible points of interest by probability of being the present point of interest is additionally based on the user-input key board or touch screen information.

27. The method of claim 1, further comprising sensing or determining barometric information, wherein ranking the possible points of interest by probability of being the present point of interest is additionally based on the barometric information.

28. A mobile device, comprising:
a plurality of sensors;
a processor operative to receive at least one input from the plurality of sensors wherein the processor is further operative to:
  obtain spatial information about a user tracked over time over a plurality of locations;
  obtain temporal information tracked over time including a history of durations of time and frequency of past point of interest visits of the user, and timing associated with the spatial information;
  obtain behavior patterns of the user tracked over time, including sequences of previous point of interest visits, speed and position of the user;
  obtaining behavior of the user's use of the mobile device;
  identify activity motion of the user, including sensing acceleration or gyro motion of the mobile device and associating the sensed acceleration or gyro motion of the mobile device with spatial information of the mobile device;
  obtain identification of wireless access points; and
  automatically determine a present point of interest of the user based on the user-related information, comprising;
  disambiguating between potential points of interest to determine the present point of interest comprising generating a list of possible points of interest and ranking the possible points of interest by probability of being the present point of interest based on the spatial information, the temporal information, the behavior patterns of the user, the user's use of the mobile device, the identified activity motion of the user, and the identifications of wireless access points.

29. A program storage device readable by a machine, tangibly embodying a program of instructions that when executed by a mobile device connectable to the machine, cause the mobile device to perform a method of determining a point of interest of a user, comprising;
  obtaining, the mobile device, spatial information about the user tracked over time over a plurality of locations;
  obtaining, by the mobile device, temporal information tracked over time including a history of durations of time and frequency of past point of interest visits of the user, and timing associated with the spatial information;
  obtaining, by the mobile device, behavior patterns of the user tracked over time, including sequences of previous point of interest visits, speed and position of the user;
  obtaining, by the mobile device, behavior of the user's use of the mobile device;
  identifying activity motion of the user, including sensing acceleration or gyro motion of the mobile device and associating the sensed acceleration or gyro motion of the mobile device with spatial information of the mobile device;

obtaining, by the mobile device, identifications of wireless access points; and automatically determining the present point of interest of the user after the user has arrived at the present point of interest, comprising;

disambiguating between potential points of interest to determine the present point of interest comprising generating a list of possible points of interest and ranking the possible points of interest by probability of being the present point of interest based on the spatial information, the temporal information, the behavior patterns of the user, the user's use of the mobile device, the identified activity motion of the user, and the identifications of wireless access points.

30. The program storage device of claim 29, further comprising the program of instructions being downloadable from the machine to the mobile device.

* * * * *